Patented July 2, 1935

2,006,557

UNITED STATES PATENT OFFICE 2,006,557

STABLE EMULSIONS

Samuel Lenher and Charles T. Mentzer, Jr., Wilmington, Del., assignors to E. I. du Pont de Nemours & Company, Wilmington, Del., a corporation of Delaware No Drawing. Application March 17, 1933, Serial No. 661,420

4 Claims. (Cl. 252—6)

This invention relates to aqueous emulsions of substances insoluble or sparingly soluble in water, more particularly emulsions possessing wetting and penetrating power, and a process for the production thereof.

It is an object of the present invention to prepare aqueous emulsions which are stable, that is, which do not break or separate into layers or deposit solid matter on standing for long periods of time, and which are suitable for wide use as wetting out and penetrating emulsions. A further object is the production of stable emulsions which possess high wetting out and penetrating power without the property of excessive foaming which usually accompanies penetrating properties. A still further object is the provision of a new and improved process for producing emulsions of the character described. Other objects will appear hereinafter.

These objects are accomplished according to the broader aspects of the invention whereby stable emulsions are produced by emulsification of alkyl naphthalene sulfonic acids or salts thereof with water, an alkaline reacting substance, a higher aliphatic compound containing a fatty acid radical, being selected from the class of compounds of this type which are water-soluble or become water-soluble when treated with the alkaline reacting substance, and a water-immiscible or only partly miscible alcoholic residue obtained by the hydrogenation of carbon oxides.

In preparing these emulsions the following procedure is preferably employed. The alkyl naphthalene sulfonic acid or salt thereof is dissolved in water and the alkaline reacting agent, preferably a strong alkali such as an alkali metal hydroxide, is added with agitation. Finally, a mixture or solution of a higher fatty acid derivative and an alcoholic residue, having the characteristics described, is added slowly with agitation. The alkyl naphthalene sulfonic acid or salt thereof should preferably be dissolved in water at about 80° C. to about 90° C. and made alkaline with sodium hydroxide or potassium hydroxide to contain about 1% to about 2% free alkali. The higher fatty acid derivative is preferably dissolved in the alcoholic residue and this mixture added slowly with constant agitation to the aqueous alkaline solution of the alkyl naphthalene sulfonic acid or salt thereof, prepared as above described. The resultant emulsion is stable to aging and is of the so-called "clear" type.

While the invention is susceptible to considerable variation and modification in the manner of its practical application, particularly as regards the proportions of materials and the exact method of procedure, the following examples, in which the parts are by weight, will serve to illustrate the type of compositions falling within the invention and how they may be prepared.

Example I

Dissolve 13.0 parts of di-isopropyl naphthalene sodium sulfonate in 42.0 parts of water at 90° C. and add slowly with agitation 5.0 parts of 25% caustic soda to form a clear solution. Add slowly with constant agitation a mixture of 11.0 parts of Turkey red oil and 29.0 parts of an alcoholic residue (boiling from about 150° C. to 250° C.), obtained by the hydrogenation of carbon oxides. The resultant emulsion is a clear brown liquid.

Example II

Dissolve 30.0 parts of di-isopropyl naphthalene sodium sulfonate in 24.0 parts of water at 90° C. and add slowly 4.0 parts of 25% caustic soda. Dissolve 2.0 parts of oleic acid (red oil) in 40.0 parts of an alcoholic residue (boiling from 150° C. to 250° C.), obtained by the reduction of carbon monoxide with hydrogen, and add slowly with constant agitation to the alkaline solution. The resultant emulsion is a clear brown viscous liquid.

Example III

Dissolve 30.0 parts of di-isopropyl naphthalene sodium sulfonate in 18.0 parts of water at 85° C. to 90° C. and add 10.0 parts of aqua ammonia. Dissolve 2.0 parts of stearic acid in 40.0 parts of an alcoholic residue (boiling from about 195° C. to about 250° C.), obtained by the reduction of carbon monoxide with hydrogen, and add slowly with agitation to the alkaline aqueous solution. The resulting clear emulsion is stable.

It will be understood that the foregoing examples are merely illustrative. The emulsions described in the examples may contain varying proportions of the ingredients enumerated and various other compounds falling within the broader aspects of the invention may be substituted for those specifically described.

The alkyl naphthalene sulfonic acids or salts thereof preferably employed in accordance with the invention are those containing at least two carbon atoms in the alkyl chain or chains, for example, isopropyl naphthalene sulfonic acid, butyl naphthalene sulfonic acid, amyl naphthalene sulfonic acid, di-isopropyl naphthalene sulfonic acid, tri-isopropyl naphthalene sulfonic acid and the sodium potassium, and ammonium salts thereof. Mixtures of the various alkyl naphthalene sulfonic acids or salts thereof may be used. Thus, very desirable results have been obtained in the use of mixtures of tri-isopropyl naphthalene sulphonic acid with di-isopropyl naphthalene sulfonic acid and mixtures of the alkali metal salts of these acids. It has been found, furthermore, that the results obtained are usually better with alkyl naphthalene sulfonic acids containing more than one alkyl chain, i. e., poly alkyl naphthalene sulfonic acids.

The emulsions prepared preferably contain not more than about 40% of alkyl naphthalene sulfonic acid or salt thereof. The practical upper limit of the amount of alkyl naphthalene sulfonic acid or salt thereof is normally regulated by the ease of preparation, the difficulty of preparation increasing with the solids content of the emulsion. The lower limit is determined by practical considerations, such as the purpose for which the emulsion is to be used, the wetting and penetrating effect normally increasing with increased proportions of alkyl naphthalene sulfonic acid or salt thereof present in the emulsion.

As previously indicated, the alkaline reacting substance is preferably an alkali metal hydroxide such as, for example, sodium hydroxide or potassium hydroxide. It will be understood that by "alkaline reacting substance" is meant a substance which gives an alkaline reaction in water solution. As further examples of such substances may be mentioned sodium carbonate, sodium bicarbonate, sodium metasilicate, potassium carbonate, potassium bicarbonate, ammonium carbonate, ammonium bicarbonate, diethanolamine, triethanolamine, trisodium phosphate, disodium phosphate, ammonia, and the like. The amount of alkaline reacting substance used in preparing the emulsion may vary within relatively wide limits, depending largely upon the particular alkaline substance employed. In general, it is preferable that not more than about 3%, based on the weight of a neutral emulsion, of alkaline reacting substance should be used. The lower limit is preferably about 0.5%, based on the weight of a neutral emulsion.

As illustrations of higher fatty acids or salts thereof which may be employed in the preparation of emulsions in accordance with the invention may be mentioned oleic acid, stearic acid, palmitic acid, ricinoleic acid and the potassium, sodium and ammnoium salts of these acids. Higher aliphatic fatty acid derivatives which have given particularly desirable results are the water-soluble fatty oils, such as, for example, Turkey red oils (sulfonated oils of the castor oil or olive oil type). Other sulfonated or sulfated oils obtained by the sulfonation or sulfation of the glycerides of higher fatty acids and other derivatives of the glycerides, including the sulfonated or sulfated fatty acids (e. g., sulfo ricinoleic acid), may be employed in accordance with the present invention. Thus, the higher fatty acid derivatives employed may include water-soluble derivatives of olive oil and linseed oil. As further examples of higher fatty acid derivatives which may be used be mentioned the alkylolamine salts or derivatives of higher fatty acids, such as, for example, the alkylolamine salts of oleic, stearic and ricinoleic acids, and the reaction products of alkylolamines with sulfonated higher fatty acids and sulfonated fatty oils, including the reaction products of oleic acid with triethanolamine, oleic acid with mixtures of di- and triethanolamines, ricinoleic acid with diethanolamine, castor oil with triethanolamine, stearic acid with triethanolamine, oleic acid with 1-amino-2:3-dihydroxy propane, oleic acid with methyl diethanolamine, sulfated castor oil with monoethanolamine, sulfated castor oil with mixtures of di- and triethanolamines, and sulfo ricinoleic acid with triethanolamine. In general, while the proportions of the fatty acid derivative incorporated into the emulsion may vary widely, it is preferable to employ not less than about 5% and not more than about 20%, based on the weight of emulsion, of a soluble oil, such as Turkey red oil, or not less than about 1% and not more than about 5% of a fatty acid or salt thereof.

The composition of the alcoholic residues which may be used in the preparation of emulsions as herein described is subject to considerable variation. The alcoholic residues which have been used in the practice of the invention and have given especially desirable results were obtained by the hydrogenation of a carbon oxide under elevated temperatures and pressures, as described, for example, in U. S. Patent No. 1,820,417, granted to Roger Williams. The various components of these compositions have not been determined in every instance, but they are known to be exceedingly complex mixtures comprising substantially branched chain aliphatic primary and secondary alcohols and also containing some ketones, esters, aldehydes and ethers. The particular compositions which have been found to be effective for the present invention are the alcoholic residues obtained after the distillation of methanol and other low boiling substances. In contrast to methyl and ethyl alcohol which are miscible with water in all proportions, these alcoholic residues are water-immiscible or only partly miscible. In general, their densities are less than 1.0 so that they will float on water. The following table will illustrate the physical characteristics of various fractions:

*Table I*

| Boiling point of material | Density 60° F. / 60° F. | cc/100 cc. Solubility of water in material at 68° F. (20° C.) | cc/100 cc. Solubility of material in water at 68° F. (20° C.) | Viscosity at 100° F. poises X $10^3$ | Viscosity in saybolt seconds at 100° F. (calculated) |
|---|---|---|---|---|---|
| 103-133 | 0.8090 | 12.5 | 5.5 | 8.31 | 31 |
| 133-140 | 0.8325 | 0.8 | 0.2 | 8.93 | 31 |
| 140-50 | 0.8343 | 2.2 | 0.5 | 8.96 | 31 |
| 150-60 | 0.8389 | 2.0 | 0.2 | 9.01 | 31 |
| 160-up [1] | 0.8544 | Insol. | 0.1 | 9.41 | 31 |
| 160-up (dehydrated) | 0.8526 | 0.9 | 0.1 | 9.83 | 31 |
| 160-175 | 0.8464 | 1.3 | 0.1 | 9.18 | 31 |
| 175-up | 0.8611 | 0.7 | Insol. | 10.24 | 32 |

[1] Containing some water.

Fractions boiling within the range of about 150° C. to about 250° C. have given especially desirable results. The following table will illustrate the composition of various alcoholic residues which may be used:

Table II

| Boiling range of fraction °C. | Components | Boiling points of components °C. | Approximate composition of fraction in percent |
|---|---|---|---|
| 150–160 | 2-4-dimethylpentanol-1 | 159.5 | 65± |
|  | Secondary alcohols [1] |  | 35± |
| 160–170 | 4-methyl-hexanol-1 | 165.0 | 40± |
|  | 2-4-dimethyl-hexanol-1 | 171.0 | 25± |
|  | Secondary alcohols [1] |  | 35± |
| 160–190 | 4-methyl-hexanol-1 | 165.0 | 40± |
|  | 2-4-dimethyl-hexanol-1 | 171.0 | 15± |
|  | 4-methyl-heptanol-1 [2] | 181.5 | 5± |
|  | Secondary alcohols [1] |  | 40± |
| 140–150 | 2-methyl-pentanol-1 | 147.0 | 65± |
|  | 4-methyl-pentanol-1 | 146.5 |  |
|  | Secondary alcohols [1] |  | 35+ |

[1] Including small amounts of primary alcohols and unidentified substances.
[2] Identification not conclusive.

As will be recognized the composition of these alcoholic residues may vary according to the method of their preparation.

While the proportions of the alcoholic residue employed in preparing the emulsions is subject to variation, it is generally desirable that the emulsion contain not more than 90% of the alcoholic residue, based on the weight of the emulsion. The weight ratio of alcoholic residue to alkyl naphthalene sulfonic acid or salt thereof should preferably be at least 1.2:1 in order that the resultant composition may have good antifoaming properties.

Compositions which represent preferred products of the invention may contain not less than about 10% and not more than about 40% alkyl naphthalene sulfonic acid or salt thereof, not less than about 0.5% and not more than about 3.0% of free alkali metal hydroxide or equivalent proportions of another alkaline reacting substance required to give the same alkalinity in water solution, not less than about 5% and not more than about 20% of a water-soluble sulfated or sulfonated glyceride of a higher fatty acid (e. g., a Turkey red oil), and an alcoholic residue of the character described boiling above about 150° C. in a weight ratio corresponding to at least 1.2 times the weight of the alkyl naphthalene sulfonic acid, these compositions giving with sufficient water for emulsification, stable emulsions of the clear type.

The emulsions prepared by this invention find many and varied uses where penetration of aqueous or non-aqueous solutions without excessive foaming is desired. Some of these uses are in the dyeing of vat colors using penetrating assistants where excessive foaming is injurious to good dyeing practise, in the printing of dyes on textiles where penetration is desired without foaming which will blur or spread the printed design, and in the impregnation of solutions of all kinds into paper, textiles and the like, without foaming of the impregnating solution.

Throughout the specification and claims it will be understood that the expression "alkyl naphthalene sulfonate" is intended to include alkyl naphthalene sulfonic acids as well as their water-soluble salts, e. g., the alkali metal salts. For convenience, the fatty acid derivatives are designated as "fatty acid compounds" this expression including fatty acid derivatives of the character previously described, which are water-soluble or become water-soluble when treated with an alkaline reacting substance.

As many apparently widely different embodiments of this invention may be made without departing from the spirit and scope thereof, it is to be understood that we do not limit ourselves to the specific embodiments thereof except as defined in the following claims.

We claim:
1. Stable emulsions of the clear type suitable for use as wetting and penetrating agents, which comprise the emulsification product of water, about 10% to about 40% alkyl naphthalene sulfonate, about 0.5% to about 3% alkali metal hydroxide, about 5% to about 20% water-soluble oil obtained by sulfonation of a glyceride of a higher fatty acid, and a substantially water-insoluble alcoholic residue, having a density less than 1.0, boiling within the range of about 150° C. to about 250° C., obtained by the synthesis of carbon monoxide and hydrogen, said alcoholic residue being present in a weight ratio corresponding to at least 1.2 times the weight of the alkyl naphthalene sulfonate but not being more than about 90% by weight of the emulsion.

2. A stable emulsion of the clear type suitable for use as a wetting and penetrating agent, which comprises the product obtained by dissolving about 13 parts of di-isopropyl naphthalene sodium sulfonate in about 42 parts of water at 90° C., adding slowly with agitation about 5 parts of 25% sodium hydroxide solution, and introducing into the resultant product with agitation a mixture of about 11 parts of sulfonated castor oil and about 29 parts of an alcoholic residue boiling within the range of about 150° C. to about 250° C., obtained by the hydrogenation of carbon oxide.

3. The process of preparing a stable emulsion of the clear type suitable for use as a wetting and penetrating agent which comprises dissolving 13 parts of di-isopropyl naphthalene sodium sulfonate in 42 parts of water at about 90° C., adding slowly with agitation about 5 parts of a 25% sodium hydroxide solution, and introducing into the resultant solution with agitation a mixture of about 11 parts of the reaction product of concentrated sulfuric acid with castor oil at relatively low temperatures and 29 parts of an alcoholic residue boiling within the range of about 150° C. to about 250° C., obtained by the hydrogenation of carbon oxide.

4. Stable emulsions of the clear type suitable for use as wetting and penetrating agents, which comprise the emulsification product of water, about 10% to about 40% alkyl naphthalene sulfonate, about 0.5% to about 3% alkali metal hydroxide, a solubilizer selected from the group consisting of higher fatty acids, salts of higher fatty acids, sulfonated higher fatty acids and alkylolamine salts of higher fatty acids, and a substantially water-insoluble alcoholic residue, having a density less than 1.0, boiling within the range of about 150° C. to about 250° C., obtained by the synthesis of carbon monoxide and hydrogen, said alcoholic residue being present in a weight ratio corresponding to at least 1.2 times the weight of the alkyl naphthalene sulfonate but not being more than about 90% by weight of the emulsion.

SAMUEL LENHER.
CHARLES T. MENTZER, Jr.